Feb. 23, 1932. W. F. HANDS 1,846,422
CLAMP
Filed May 8, 1931
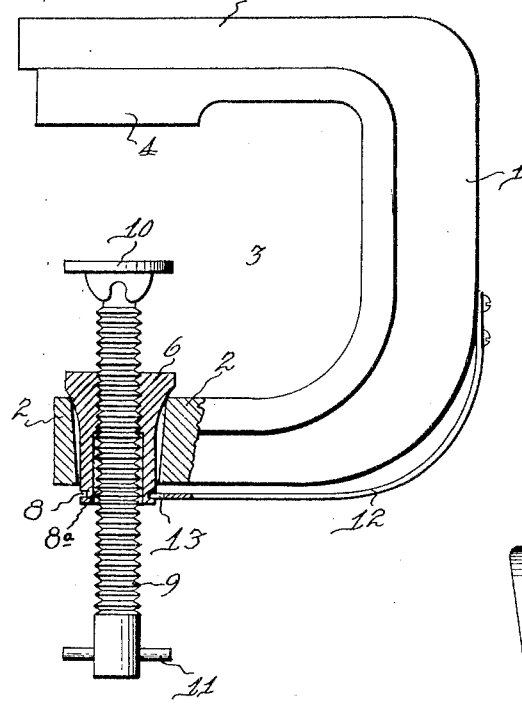
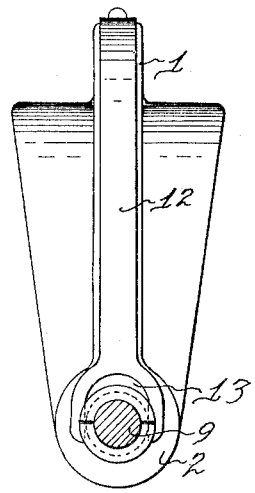
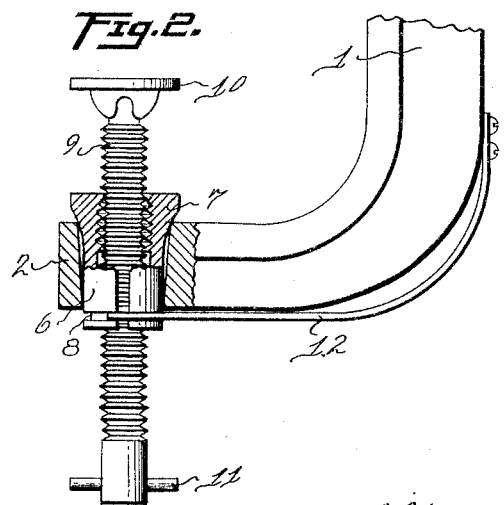
William F Hands
INVENTOR.

Patented Feb. 23, 1932

1,846,422

UNITED STATES PATENT OFFICE

WILLIAM F. HANDS, OF TORONTO, ONTARIO, CANADA

CLAMP

Application filed May 8, 1931. Serial No. 535,835.

The invention relates to improvements in clamps as described in the present specification and shown in the accompanying drawings that form a part of the same.

The main object of the invention is to effect a saving of time and effort in bringing the movable jaw into and out of gripping engagement with the work without the necessity of having to screw up the clamping screw the full distance, this being accomplished through the provision of means whereby the said screw may be moved freely in its bearing and is automatically locked in any position in which it is left.

The invention consists in the novel features of construction, combinations and arrangements of parts as described in the present specification and more particularly pointed out in the claims for novelty following.

In the drawings Figure 1 is a side elevation of my improved clamp in its operating position, a portion thereof being in vertical section.

Figure 2 is a side elevation, partly in vertical section, of a portion of the clamp with the split nut open.

Figure 3 is a cross sectional view taken on the line 3—3 of Figure 2.

Like numerals of reference indicate corresponding parts in the various figures.

Referring to the drawings the body 1 of the clamp is shown as being of conventional form but may of course be made in any desired shape and is provided with a hollow head 2 having its bore at right angles to the work opening 3 and positioned in opposed alignment with a plane work engaging surface 4 provided on the arm 5 of the clamp.

An interiorly threaded, longitudinally split nut, or sleeve, 6 of lesser diameter throughout the greater portion of its length than the bore of the head 2 operates within said bore and projects from opposite ends thereof, that end which extends into the work opening 3 being provided with an exterior tapered enlargement 7 of greater diameter than the bore through the head and adapted, when the nut is drawn into the head towards the outer side thereof, to engage the inner end of the head and thereby cause the two sections of the nut to be brought into contact with each other, the outer end of said nut being provided with an annular groove 8. The nut 6 is threaded interiorly from the inner enlarged end to approximately the point where the exterior taper ends and from this point outwardly the bore is preferably enlarged slightly as at 8a.

An exteriorly threaded clamping screw 9 operates within the nut 6, loosely when the two sections of said nut are spaced, as when the said nut is forced towards the work opening, and in threaded engagement with the nut when the latter is closed, said screw being provided with a work engaging jaw 10 on its inner end and adjacent to its outer end with a hand grip 11, or other suitable device whereby said screw may be rotated.

A strap 12, of spring material, has one of its ends fastened to the body of the clamp from which it extends around the one arm thereof and is bifurcated at its other end to provide fingers 13 fitting the groove in the outer end of the nut 6 and exerting outward pressure on said nut to hold same normally closed and in threaded engagement with the clamping screw 9.

In the operation of the invention the clamp is placed over the object, or objects, to be clamped and inward pressure is brought to bear on the screw 9 which causes the tapered split nut 6 to move inwardly in the head 2 against the pressure of the spring 12 and to open out and thus allow the screw to slide freely into engagement with the work, after which the screw is given sufficient turns to provide a rigid grip on the work. To release the clamp it is simply necessary to push inwardly on the spring strap 12 which has the effect of moving the tapered end of the nut inwardly and allowing the sections thereof to recede from one another and thus release the screw 9 which will then fall away from engagement with the work.

What I claim is:—

1. The combination in a clamp having a fixed jaw and a head having an opening therethrough in opposed alignment with said jaw, of an interiorly threaded split nut slidable in said opening and extending from opposite ends thereof, said nut at its inner end being of greater diameter than that of said opening and tapering to a lesser diameter than that of said opening, a clamping screw operating within said nut, and spring means exerting outward pressure on said nut and holding same normally closed.

2. The combination in a clamp having a fixed jaw and a head having an opening therethrough in opposed alignment with said jaw, of an interiorly threaded split nut slidable in said opening and extending from opposite ends thereof, said nut at its inner end being of greater diameter than that of said opening and tapering to a lesser diameter than that of said opening, a clamping screw operating within said nut, and a flexible member of spring material exerting an outward pull on the outer end of said split nut, said member being fixed at one of its ends to said clamp and at its other end operatively engaging said nut.

3. A clamp including a fixed jaw and a head having an opening therethrough in opposed alignment with said jaw, a split nut slidable longitudinally in the opening in said head and projecting from opposite ends thereof, said nut at its inner end being of greater diameter than the said opening and tapered towards the outer end thereof whereby its diameter throughout the greater portion of its length is less than that of said opening to permit of said nut opening, a clamping screw operating within said nut, and a manually releasable spring exerting an outward pull on the outer end of said nut to hold said nut normally closed over said screw.

4. A clamp comprising a body having opposed arms extending at right angles thereto, one of said arms constituting a fixed jaw and the other of said arms having a head provided with an opening therethrough at right angles to said arm and opposing said fixed jaw, a split nut slidably operating within said opening, the outer wall of said nut being enlarged and tapered from the inner end thereof to substantially the longitudinal centre thereof, an exteriorly threaded clamping screw operating within said split nut, said nut being threaded interiorly from the inner end thereof to substantially the longitudinal centre thereof and being enlarged and of smooth bore from such point to the outer end thereof, and spring means holding said split nut normally closed.

Signed at Toronto, Ont., this 18th day of April, 1931.

WILLIAM F. HANDS.